US005358558A

United States Patent [19]

Yamamoto et al.

[11] Patent Number: 5,358,558

[45] Date of Patent: Oct. 25, 1994

[54] INK-JET TEXTILE PRINTING INK AND INK-JET TEXTILE PRINTING PROCESS

[75] Inventors: Tomoya Yamamoto; Shoji Koike, both of Yokohama; Koromo Shirota, Inagi; Shinichi Satoh, Yokohama, all of Japan

[73] Assignee: Canon Kabushiki Kaisha, Tokyo, Japan

[21] Appl. No.: 87,066

[22] Filed: Jul. 7, 1993

Related U.S. Application Data

[63] Continuation of Ser. No. 948,492, Sep. 22, 1992, Pat. No. 5,250,121.

[30] Foreign Application Priority Data

| | | | |
|---|---|---|---|
| Sep. 26, 1991 | [JP] | Japan | 3-247637 |
| Sep. 26, 1991 | [JP] | Japan | 3-247638 |
| Sep. 26, 1991 | [JP] | Japan | 3-247639 |
| Sep. 26, 1991 | [JP] | Japan | 3-247640 |
| Sep. 26, 1991 | [JP] | Japan | 3-247641 |
| Sep. 26, 1991 | [JP] | Japan | 3-247642 |
| Nov. 13, 1991 | [JP] | Japan | 3-297290 |
| Nov. 13, 1991 | [JP] | Japan | 3-297291 |
| Nov. 13, 1991 | [JP] | Japan | 3-297292 |

[51] Int. Cl.[5] .......... C09D 11/02

[52] U.S. Cl. .......... 106/22 R; 106/20 D; 428/289; 347/100

[58] Field of Search .......... 106/22 R, 20 R, 20 D; 346/1.1; 428/289

[56] References Cited

U.S. PATENT DOCUMENTS

| | | | |
|---|---|---|---|
| 4,652,486 | 3/1987 | Tasaka et al. | 106/20 R |
| 4,702,742 | 10/1987 | Iwata et al. | 8/495 |
| 4,725,849 | 2/1988 | Koike et al. | 346/1.1 |
| 4,849,770 | 7/1989 | Koike et al. | 106/20 D |
| 4,923,515 | 5/1990 | Koike et al. | 106/22 |
| 4,969,951 | 11/1990 | Koike et al. | 106/22 |
| 5,017,227 | 5/1991 | Koike et al. | 106/22 |
| 5,074,914 | 12/1991 | Shirota et al. | 106/22 |
| 5,099,255 | 3/1992 | Koike et al. | 346/1.1 |
| 5,101,217 | 3/1992 | Iwata et al. | 346/1.1 |
| 5,123,960 | 6/1992 | Shirota et al. | 106/22 |

FOREIGN PATENT DOCUMENTS

| | | |
|---|---|---|
| 0447896 | 9/1991 | European Pat. Off. . |
| 54-59936 | 5/1979 | Japan . |
| 61-231289 | 10/1986 | Japan . |
| 62-283174 | 12/1987 | Japan . |
| 63-168382 | 7/1988 | Japan . |

OTHER PUBLICATIONS

Patent Abstracts of Japan, vol. 12, No. 405 (C-539), with respect to Japanese Patent Document No. 63-145379 (Jun. 17, 1988).

*Primary Examiner*—Helene Klemanski
*Attorney, Agent, or Firm*—Fitzpatrick, Cella, Harper & Scinto

[57] ABSTRACT

An ink-jet textile printing ink, comprising from 5% to 30% by weight of a reactive dye having at least one of a monochlorotriazine group and a vinyl sulfone group, and a water-based liquid medium, wherein said liquid medium comprises from 1% to 50% by weight of thiodiglycol and from 2% to 45% by weight of at least one organic solvent selected from a di-, tri-, or tetramer of oxyethylene, a di-, tri-, or tetramer of oxypropylene, and a mono- or di-$C_1$-$C_4$-alkyl ether of any of these di-, tri- or tetramers.

26 Claims, 3 Drawing Sheets

INK-JET TEXTILE PRINTING INK AND INK-JET TEXTILE PRINTING PROCESS

This application is a continuation of application Ser. No. 07/948,492 filed Sep. 22, 1992 now U.S. Pat. No. 5,250,121.

BACKGROUND OF THE INVENTION

1. Field of the Invention

The present invention relates to an ink composition for ink-jet textile printing. More particularly, it relates to an ink-jet textile printing ink, suited for textile printing on woven fabric or nonwoven fabric mainly composed of cellulose fibers such as cotton, capable of being dyed with a reactive dye, or mixed woven fabric or mixed nonwoven fabric comprised of any of these fibers and other synthetic fibers. The present invention also relates to an ink-jet textile printing process making use of such an ink.

2. Related Background Art

Screen textile printing and roller textile printing are presently prevaling as textile printing. These methods, however, are not suited for the multi-item and small-quantity production and cannot quickly respond to fashion with ease. Accordingly, there is a recent demand for establishing electronic textile printing systems that require no printing plates. To answer such a demand, a number of proposals have been made on textile printing carried out by ink-jet recording, which increasingly attracts expectations from various fields.

Ink-jet textile printing inks are required to have the following performances.

(1) They impart densities sufficient for color formation.

(2) They cause no clogging of ink ejection orifices or ink passages of a head.

(3) Inks quickly dries on cloths.

(4) They less irregularly run on cloths.

(5) During storage, they undergo no changes in their physical properties and are free from precipitation of solid matters.

(6) They cause no changes in ejection performance even in running over a long period of time. In particular, in the method in which a change in volume by the action of heat energy is utilized to eject ink, as disclosed in Japanese Patent Application Laid-open No. 54-59936, they cause no deposition of foreign matters on a heater that provides the heat energy or cause no break of the heater when cavitation occurs during debubbling.

In order to satisfy these performance requirements, the following measures have been hitherto taken.

With regard to item (1), a measure commonly taken is that dyes are used in a high concentration to impart sufficient densities, which is essential particularly when small droplets of 200 pl or less are used or when cloths with a strong absorbing power are used. Inks used therefor, however, may become thick as a result of evaporation of ink from nozzle tips or cause precipitation of dyes, i.e., the solid matters, to often bring about the problem noted in item (2). Now, with regard to item (2), a measure has been taken such that polyhydric alcohols such as glycerol are added. When, however, a dye is in a concentration of 5% or more, there is no particular means that can be said to be perfect enough to solve the problem. Thus, no satisfactory results can be obtained except that the dye and a solvent are used in particularly unusual combination.

With regard to item (3), the water repellency of cloths has a great influence. There, however, is no particular problem when, for example, water-based inks are used on cloths mainly composed of cellulose fibers. With regard to item (4), a number of proposals have been already made. For example, addition of tannin to ink is proposed in Japanese Patent Application Laid-open No. 61-231289, and addition of a carboxylic acid group-containing polymer, in Japanese Patent Application Laid-open No. 62-283174. Both of them, however, cannot avoid the problem noted in item (2). With regard to items (5) and (6), problems are often ascribable to the structures of dyes, but have not been well settled since no detailed studies have been made.

As discussed above, some conventional techniques can provide measures by which some of the above performances required in ink-jet textile printing inks can be satisfied individually. Under existing circumstances, however, no textile printing ink and ink-jet textile printing process are known until now which can satisfy these performances at the same time and can solve such a series of problems.

SUMMARY OF THE INVENTION

Accordingly, on the condition that cloths on which textile printing is made are limited to cloths mainly composed of cellulose fibers, an object of the present invention is to provide an ink and a textile printing process that can simultaneously solve the aforesaid problems hitherto commonly involved in textile printing inks and in ink-jet textile printing, i.e., the problems on textile printing that must be solved to obtain sharp and highly dense printed articles, and the problems on ejection performance of an ink-jet recording apparatus, that must be solved to carry out printing in a stable state for a short or long period of time and in a high reliability.

Another object of the present invention is to provide an ink and a textile printing process that can simultaneously solve the aforesaid problems even when reactive dyes with different color systems are contained in order to answer a demand for color tones after color formation.

The above objects can be achieved by the present invention described below.

The present invention provides an ink-jet textile printing ink, comprising from 5% to 30% by weight of a reactive dye having at least one of a monochlorotriazine group and a vinyl sulfone group, and a water-based liquid medium, wherein said liquid medium comprises from 1% to 50% by weight of thiodiglycol and from 2% to 45% by weight of at least one organic solvent selected from a di-, tri- or tetramer of oxyethylene, a di-, tri- or tetramer of oxypropylene, and a mono- or di-$C_1$–$C_4$-alkyl ether of any of these di-, tri- or tetramers.

The present invention also provides any desired color inks in which corresponding specific reactive dyes described later are used in the ink as described above.

The present invention further provides an ink-jet textile printing process comprising the steps of imparting a textile printing ink to a cloth containing cellulose fibers, by ink-jet recording making use of a heat energy, and subsequently fixing a dye in said ink to said fibers, wherein said textile printing ink comprises from 5% to 30% by weight of a reactive dye having at least one of a monochlorotriazine group and a vinyl sulfone group, and a water-based liquid medium; said liquid medium comprising from 1% to 50% by weight of thiodiglycol and from 2% to 45% by weight of at least one organic solvent selected from a di-, tri- or tetramer of oxyethylene, a di-, tri- or tetramer of oxypropylene, and a mono- or di-$C_1$–$C_4$-alkyl ether of any of these di-, tri- or tetramers.

The present invention still further provides a color ink-jet textile printing process in which a plurality of color inks corresponding to the aforesaid color inks are used in the process as described above.

The present invention still further provides a recording unit comprising an ink holder that has held an ink, and a head having a plurality of orifices from which said ink is ejected in the form of ink droplets, wherein said ink is the ink as described above.

The present invention still further provides an ink cartridge comprising an ink holder that holds an ink, wherein said ink is the ink as described above.

The present invention still further provides an ink-jet recording apparatus comprising the recording unit as described above, said ink being the ink as described above.

The present invention still further provides a set of ink compositions used in a color ink-jet recording apparatus, comprising a plurality of color inks as described above.

Other objects and features of the present invention will become apparent from the following description.

DESCRIPTION OF THE PREFERRED EMBODIMENTS

Figure 1:
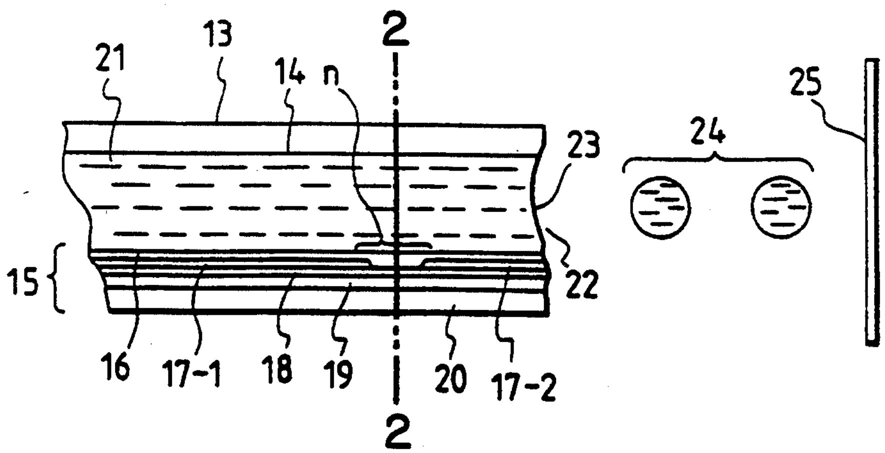
FIG. 1 illustrates a partial cross section of a head, along a passage of ink, of an ink-jet recording apparatus that can be used in the present invent ion.

The present inventors have made researches on ink-jet textile printing inks to improve inks so that the various performance requirements as stated above can be satisfied at the same time. As a result, they have discovered that color forming properties such as a levelness and a color yield can be dramatically improved when a high-concentration water-based ink making use of a reactive dye containing 5 to 30% by weight of a monochlorotriazine and/or a vinyl sulfone group is incorporated with a given amount of thiodiglycol. This occurs presumably because the thiodiglycol has any effect that makes the dye exhibit a maximum reactivity on the level of molecules.

They have also discovered that incorporation of the thiodiglycol brings about a stable ejection performance at an ink-jet head over a long period of time that cannot be expected at all in conventional solvents. This effect is particularly remarkable when an ink-jet head that utilizes a heat energy is used. Presumably the reasons therefor are that the mutual action between the reactive dye and the thiodiglycol prevents deposits from occurring on a heater used to generate a heat energy in the ink-jet head and that the combination of a high dye concentration with a given amount of thiodiglycol specifically prohibits the ink from becoming thick in the vicinity of ejection orifices of the ink-jet head.

They have still also discovered that, in combination with the thiodiglycol, use of at least one organic solvent selected from a di-, tri- or tetramer of oxyethylene, a di-, tri- or tetramer of oxypropylene, and a mono- or di-$C_1$–$C_4$-alkyl ether of any of these di-, tri- or tetramers, brings about remarkable improvements in a fixing property, a levelness property and a color yield while retaining other performances. The present invention has been thus accomplished.

The material used in the present invention and chiefly characterizing the present invention is thiodiglycol, which is contained in the ink in an amount ranging from 1% to 50% by weight, and preferably from 5% to 50% by weight. If the thiodiglycol is contained in an amount less than 1% by weight, coloring properties cannot be well effectively improved as a matter of course, and also the ink storage stability may be deteriorated or the ink may become thick as the ink evaporates in the vicinity of ejection orifices of the ink-jet head to cause no ejection. If it is contained in an amount more than 50% by weight, not only the coloring properties may become problematic, but also the ink storage stability may be deteriorated like the case of less than 1% by weight. In addition, with regard to ejection performance, the response to frequencies may become extremely poor. With an increase in the initial viscosity of the ink, another problem may also arise such that the ink cannot be ejected even where an ink-jet recording apparatus is left to stand for a short time.

In the present invention, the organic solvent that can bring about the remarkable effect when used in combination with the thiodiglycol includes a di-, tri- or tetramer of oxyethylene, a di-, tri- or tetramer of oxypropylene, and a mono- or di-$C_1$–$C_4$-alkyl ether of any of these di-, tri- or tetramers. Of these, diethylene glycol, triethylene glycol, triethylene glycol monomethyl, monoethyl or monobutyl ether, triethylene glycol dimethyl or diethyl ether, tetraethylene glycol dimethyl or diethyl ether, dipropylene glycol and tripropylene glycol are particularly preferred.

This at least one organic solvent selected from a di-, tri- or tetramer of oxyethylene, a di-, tri- or tetramer of oxypropylene, and a mono- or di-$C_1$–$C_4$-alkyl ether of any of these di-, tri- or tetramers, is contained in the ink in an amount of from 2% to 45% by weight, and preferably from 3% to 40% by weight, based on the total weight of the ink. The effect of the present invention can be more remarkable when the thiodiglycol and the organic solvent described above are contained in an amount of from 3% to 55% by weight, and preferably from 5% to 50% by weight, in total, based on the total weight of the ink, and also when the thiodiglycol and the organic solvent described above are contained in a proportion of from 10:1 to 1:10, and preferably from 8:1 to 1:8.

The water-based liquid medium used in the ink of the present invention is mainly composed of water, and is so used for the water as to be in a content of from 30% to 90% by weight, preferably from 40% to 88% by weight, and more preferably from 50% to 85% by weight. In addition to the water, commonly available organic solvents other than the thiodiglycol or the organic solvent described above may be used in combination in the water-based liquid medium. Such organic solvents may include, for example, ketones or ketoalcohols such as acetone and diacetone alcohol; ethers such as tetrahydrofuran and dioxane; addition polymers of oxyethylene or oxypropylene, having 5 or more carbon atoms, such as polyethylene glycol and polypropylene glycol; alkylene glycols whose alkylene group has 2 to 6 carbon atoms, such as ethylene glycol, trimethylene glycol, butylene glycol, 1,2,6-hexanetriol and hexylene glycol; sulfolane, N-methyl-2-pyrrolidone, 2-pyrrolidone, and 1,3-dimethyl-2-imidazolidinone. One or more of these may be used in combination as additional organic solvent(s). Any of these water-soluble organic solvents may be contained in an amount ranging usually from OR to 50% by weight, and preferably from 0% to 40% by weight, based on the total weight of the ink.

Next, the dyes used in the present invention, characterizing the present invention, are the reactive dyes having a monochlorotriazine group and/or a vinyl sulfone group.

Examples thereof for each color are shown below. The present invention, however, is by no means limited by these.

Yellow dyes used in the present invention may include C.I. Reactive Yellow 2, 3, 15, 17, 18, 23, 24, 24:1, 25, 21, 31, 42, 51, 16, 81, 84, 85, 81, 88, 91, 92, 93, 95, 102, 111, 116, 135, 136, 137, 138, 142, 143, 145, 151, 160, 161, 162, 163, 164, 165, 167, 168, 175 and 178, preferably 2, 15, 37, 42, 76 and 95, and more preferably 2 and 95.

Red dyes used in the present invention may include C.I. Reactive Red 3, 3:1, 13, 21, 22, 23, 24, 29, 31, 33, 35, 43, 45, 49, 55, 56, 63, 106, 111, 112, 113, 114, 126, 128, 130, 131, 141, 171, 174, 180, 183, 184, 187, 190, 193, 194, 195, 204, 218, 219, 220, 221, 222, 223, 224, 226, 228, 229, 235, 236 and 237, preferably 21, 22, 24, 33, 45, 111, 112, 114, 180, 218 and 226, and more preferably, 24, 31, 45, 218 and 226.

Cyan dyes used in the present invention may include C.I. Reactive Blue 15, 21, 25, 41, 63, 72, 77, 190, 207, 227 and 231, preferably 15, 21, 72 and more preferably 15 and 72.

Blue dyes used in the present invention may include C.I. Reactive Blue 2, 5, 13, 14, 19, 27, 28, 38, 39, 49, 52, 79, 104, 119, 122, 147, 160, 162, 166, 176, 182, 184, 187, 191, 194, 195, 198, 203, 204, 209, 211, 214, 216, 217, 220, 221, 222, 228, 230 and 235, preferably 19, 38, 49, 176, 203 and 220, and more preferably 49.

Black dyes used in the present invention may include C.I. Reactive Black 1, 5, 8, 13, 14, 31, 34 and 39, and preferably 5, 8, 31 and 39.

Orange dyes used in the present invention may include C.I. Reactive Orange 5, 7, 12, 13, 15, 16, 35, 56, 72, 72:1, 74, 82, 84, 92, 93, 95 and 99, preferably 5, 7, 12, 13, 15, 35, 56, 74, 82 and 95, and more preferably 5, 12, 13, 35 and 95.

Brown dyes used in the present invention may include C.I. Reactive Brown 2, 7, 8, 9, 11, 17, 18, 21, 31, 32, 33, 46 and 47, preferably 2, 7, 11, 17, 18, 33 and 46, and more preferably 7, 11, 33 and 46.

Green dyes used in the present invention may include C.I. Reactive Green 8, 12, 15 and 19, preferably 8 and 19, and more preferably 8.

The above numbered commercially available dyes all contain impurities, and can be used with difficulty as they are. When used, they should be purified as occasion calls.

In the ink of the present invention, a dye or dyes selected from the above groups is/are used alone or in combination. When used to obtain a given color tone by mixture with a different-color reactive dye, the dye of the above group must be in an amount of at least 0.5% by weight. The different-color reactive dye may preferably be selected from those having a monochlorotriazine group and/or a vinyl sulfone group, in particular, those listed in the above groups. In all cases, any of these dyes are used in an amount ranging from 5% to 30% by weight preferably from 6% to 25% by weight, and more preferably from 8% to 20% by weight, in total, based on the total weight of the ink.

The ink of the present invention may preferably contain from 0.1 to 30 ppm of calcium and/or magnesium so long as the ink-jet head does not clog, whereby the coloring properties such as a levelness and a color yield can be more improved. This occurs presumably because these substances have any effect that makes the dye exhibit a maximum reactivity on the level of molecules. The ink may also contain from 0.1 to 10 ppm of a substance comprising the group of silicon, iron, nickel and zinc, whereby a more stable ejection performance in the ink-jet head can be achieved for a long period of time. Hence, it is desirable to optionally add these in a small amount. This effect is particularly remarkable when an ink-jet head that utilizes a heat energy is used. The reason therefor is that, although these substances, when contained in excess, cause a lowering of bubbling force because of deposits on a heater in the ink-jet head, the formation of deposits resulting from their addition in an appropriate amount can moderate the cavitation that occurs during debubbling and prevent disconnection without causing a lowering of bubbling force.

The ink of the present invention is mainly composed as described above. It is also possible to optionally add other various types of dispersants, surface active agents, viscosity modifiers, surface tension modifiers, fluorescent brighteners and so forth so long as the ink-jet head or the like does not clog. Such additives are exemplified by viscosity modifiers such as polyvinyl alcohol, cellulose derivatives and water-soluble resins; a variety of surface active agents of an anionic, cationic or nonionic type; surface tension modifiers such as diethanolamine and triethanolamine; pH adjusters using a buffer solution, and antifungal agents.

The ink-jet textile printing process of the present invention is a process making use of the ink of the present invention. The ink-jet textile printing is carried out, for example, by the method as disclosed in Japanese Patent Application Laid-open No. 54-59936, i.e., a method in which the ink on which a heat energy has acted causes an abrupt change in its volume and the ink is ejected by the force of action caused by this change in state. Use of the ink of the present invention in such a method causes no deposition of foreign matters or no disconnection in the heating head even when recording is continuously carried out for a long period of time, and enables stable textile printing. With use of the ink of the present invention, a particularly highly effective textile printing process can be achieved preferably under conditions of an ejection droplet of from 20 to 200 pl an ink shot quantity of from 4 to 40 nl/mm$^2$, a drive frequency of 1.5 kHz or above and a head temperature of from 35° to 60° C.

Cloths used in the present invention may preferably be those mainly composed of cellulose fibers containing at least an alkaline substance. There are no particular limitations on the manner by which cloths are produced. Cloths as disclosed in Japanese Patent Applications Laid-open No. 63-168382 and No. 3-46589 can be used.

The textile printing ink according to the present invention is thus imparted onto a cloth. Since, however, the ink is merely attached to the cloth if left in this state, subsequent steps should preferably be taken to reactively fix the dye to fibers and removing unfixed or unreacted dye. Such steps of reactively fixing the dye and removing unreacted dye may be carried out by conventionally known methods, for example, by steaming, HT steaming or thermofixing, and when a previously alkaline-treated cloth is not used, by alkali pad steaming, alkali blotch steaming, alkali shock fixing or alkali cold fixing, followed by washing.

An apparatus suited for the textile printing making use of the ink of the present invention may include an apparatus in which a heat energy corresponding with a recording signal is imparted to the ink held in the interior of a recording head so that ink droplets are generated by the action heat energy.

Figure 2:
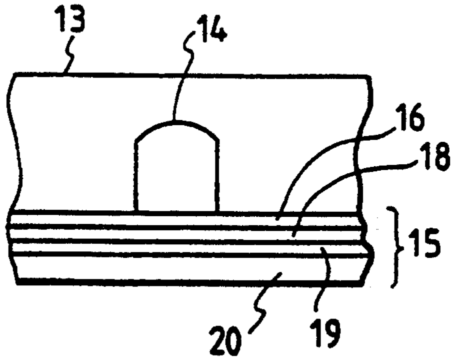
FIG. 2 is a cross section along the line 2—2 in FIG. 1.
Figure 3:
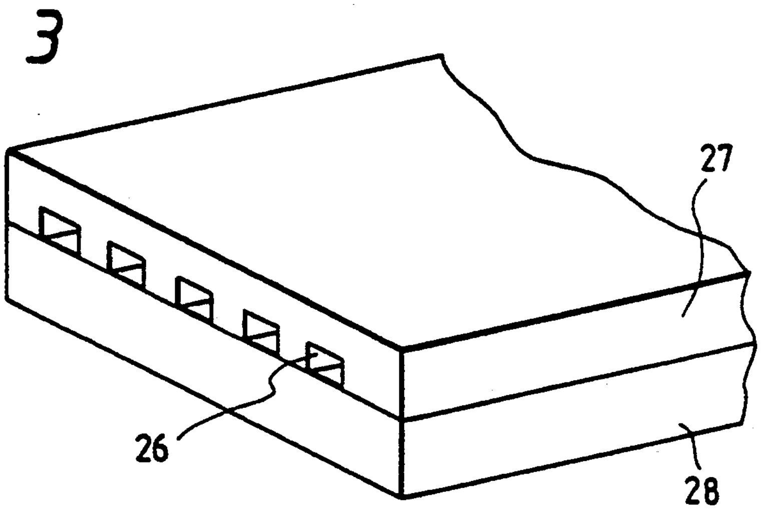
FIG. 3 is a partial illustration of the appearance of a multiple head comprising the head as shown in FIG. 1, arranged in a large number.

FIGS. 1, 2 and 3 show an example of the construction of the head, which is a main component of the apparatus. FIG. 1 illustrates a partial cross section of a head, along a passage of ink. FIG. 2 is a cross section along the line 2—2 in FIG. 1.

A head 13 is formed by bonding a glass, ceramic or plastic plate or the like having a channel 14 through which ink is passed, to a heating head 25 used in thermal recording (the drawing shows a thin-film head, to which, however, it is not limited). The heating head 15 is comprised of a protective film formed of a silicon oxide type material, aluminum electrodes 17-1 and 17-2, a heating resistor layer 18 formed of nichrome or the like, a heat accumulating layer 19, and a substrate 20 with good heat dissipation properties, made of alumina or the like. Ink 21 stands reached an ejection orifice (a minute opening) 22 and a meniscus 23 is formed there by a pressure P.

Upon application of electric signals to the electrodes 17-1 and 17-2, heat is abruptly generated at the region denoted by n in the thermal head 15, so that bubbles are generated in the ink 21 coming into contact with this region. The pressure thus produced thrusts out the meniscus 23 and the ink 21 is ejected from the orifice 22 in the form of recording minute drops 24 to fly against a recording medium 25. FIG. 3 illustrates the appearance of a multi-head comprising the head as shown in FIG. 1 arranged in a large number. The multi-head is prepared by closely bonding a glass plate 27 having a multi-channel 26, to a heating head 28 similar to the head as illustrated in FIG. 1.

Figure 4:
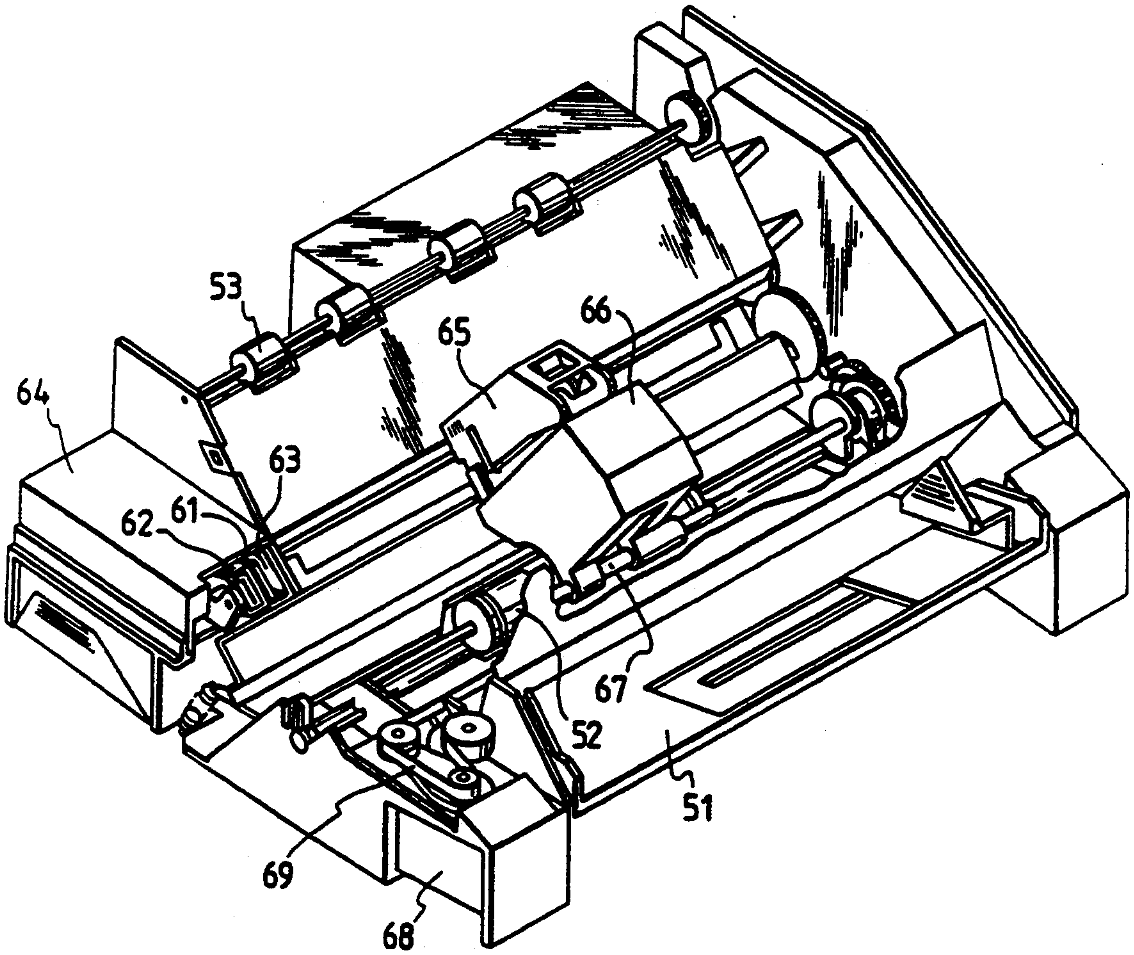
FIG. 4 is a perspective illustration of an ink-jet recording apparatus incorporated with the head as shown in FIG. 3.

FIG. 4 shows an example of the ink-jet recording apparatus in which such a head has been incorporated. In FIG. 4, reference numeral 61 denotes a blade serving as a wiping member, one end of which is a stationary end retained by a blade-retaining member, and is in the form of a cantilever. The blade 61 is provided at the position adjacent to the region in which a recording head makes a record. In the present example, the blade is retained in such a form that it projects to the course through which the recording head is moved. Reference numeral 62 denotes a cap, which is provided at the home position adjacent to the blade 61, and is so constituted that it moves in the direction perpendicular to the direction in which the recording head is moved and comes into contact with the face of ejection openings to carry out capping. Reference numeral 63 denotes an ink absorber provided adjoiningly to the blade 61, and, similar to the blade 61, is retained in such a form that it projects to the course through which the recording head is moved. The above blade 61, cap 62 and absorber 63 constitute an ejection restoration assembly 64, where the blade 61 and the absorber 63 remove the water, dust or the like from the ink ejection opening face.

Reference numeral 65 denotes the recording head having an ejection energy generating means and ejects ink to the recording medium set opposingly to the ejection opening face provided with ejection openings, to carry out recording. Reference numeral 66 denotes a carriage on which the recording head 65 is mounted so that the recording head 65 can be moved. The carriage 66 is slidably associated with a guide shaft 67. Part of the carriage 66 is connected (not shown) with a belt 69 driven by a motor 68. Thus, the carriage 66 can be moved along the guide 67 and hence the recording head 65 can be moved from a recording region to a region adjacent thereto. Reference numeral 51 denotes a feeding part from which recording mediums are inserted, and 52, a feed roller driven by a motor (not shown). With such construction, the recording medium is fed to the position opposing to the ejection opening face of the recording head, and, with progress of recording, outputted from an output section provided with a output roller 53.

In the above construction, the cap 62 of the head restoration assembly 64 is receded from the moving course of the recording head 65 when the recording head 65 is returned to its home position, e.g., after completion of recording, and the blade 61 stands projected to the moving course. As a result, the ejection opening face of the recording head 65 is wiped. When the cap 62 comes into contact with the ejection opening face of the recording head 65 to carry out capping, the cap 62 is moved in such a way that it projects to the moving course of the recording head. When the recording head 65 is moved from its home position to the position at which recording is started, the cap 62 and the blade 61 are at the same position as the position where the ejection opening face is wiped. As a result, the ejection opening face of the recording head 65 is wiped also at the time of this movement.

The aforesaid movement of the recording head to its home position is made not only at the time of the completion of recording or restoration of ejection, but also when the recording head is moved between recording regions for the purpose of recording, during which it is moved to the home position adjacent to each recording region at given intervals, where the ejection opening face is wiped in accordance with this movement.

Figure 5:
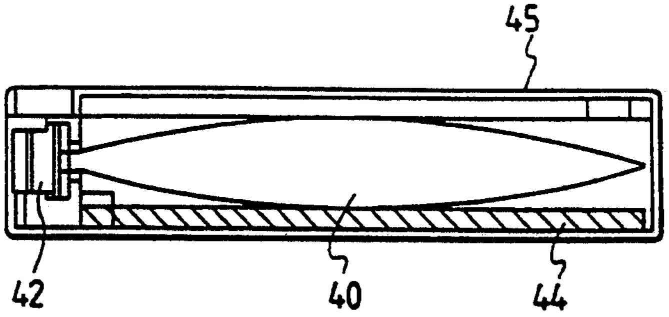
FIG. 5 is a cross-sectional illustration of an ink cartridge that has held the ink being fed to the head through a feeding tube.

FIG. 5 shows an example of an ink cartridge, denoted as 45, that has held the ink being fed to the head through an ink-feeding tube. Herein, reference numeral 40 denotes an ink bag that has held the feeding ink. The top thereof is provided with a stopper 42 made of rubber. A needle (not shown) is inserted to this stopper 42 so that the ink in the ink bag 40 can be fed to the head. Reference numeral 44 denotes an ink absorber that receives a waste ink.

The ink holder may preferably be formed of a polyolefin at its surface with which the ink comes into contact.

Figure 6:
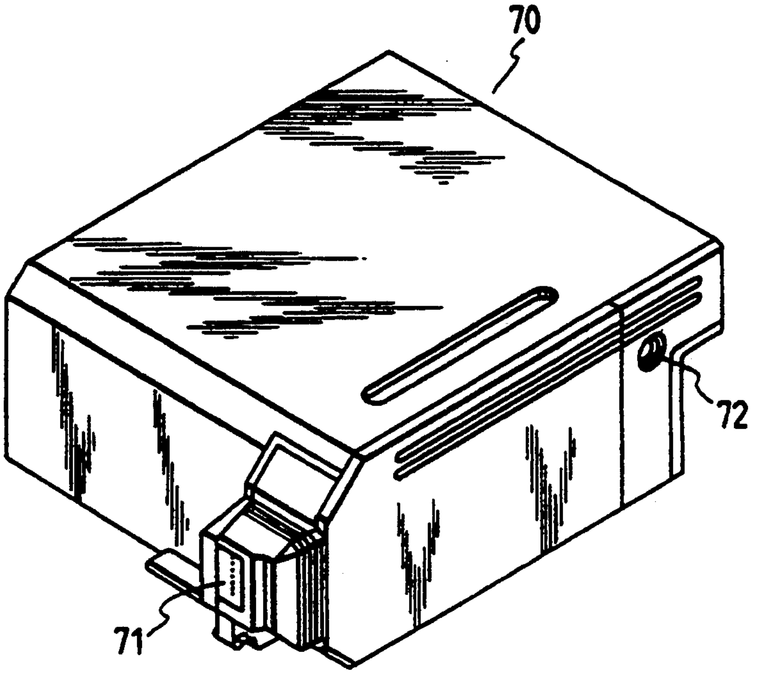
FIG. 6 is a perspective illustration of a structure in which the head and the ink cartridge are put together.

The ink-jet recording apparatus used in the present invention is not limited to the apparatus as described above in which the head and the ink cartridge are separately provided, and a device can also be preferably used in which they are integrally formed as shown in FIG. 6. In FIG. 6, reference numeral 70 denotes an ink-jet cartridge, in the interior of which an ink absorber having been impregnated with ink is contained. The ink-jet cartridge is so constructed that the ink in such an ink absorber is ejected in the form of ink droplets from a head 71 having a plurality of orifices. Reference numeral 72 denotes an air path opening through which the interior of the ink-jet cartridge is made to communicate with the atmosphere. This ink-jet cartridge 70 can be used in place of the recording head 65 shown in FIG. 4, and is detachably mounted to the carriage 66.

EXAMPLES

The present invention will be described below in greater detail by giving Examples and Comparative Examples. In the following, "part(s)" indicates "part(s) by weight".

EXAMPLE 1

| | |
|---|---|
| Reactive dye (C.I. Reactive Yellow 95) | 10 parts |
| Thiodiglycol | 26 parts |
| Diethylene glycol | 9 parts |
| Water | 55 parts |

All the above components were mixed. The aqueous mixture obtained was adjusted to pH 8.1 using sodium hydroxide, and stirred for 2 hours, followed by filtration using Fluoropore Filter FP-100 (trade name; available from Sumitomo Electric Industries, Ltd.) to provide water-based ink (1) of the present invention.

EXAMPLE 2

| | |
|---|---|
| Reactive dye (C.I. Reactive Red 24) | 10 parts |
| Thiodiglycol | 16 parts |
| Diethylene glycol | 10 parts |
| Tetraethlene glycol dimethyl ether | 4 parts |
| Water | 60 parts |

All the above components were mixed. The aqueous mixture obtained was adjusted to pH 7.7 using sodium hydroxide, and stirred for 2 hours, followed by filtration using Fluoropore Filter FP-100 (trade name; available from Sumitomo Electric Industries, Ltd.) to provide water-based ink (2) of the present invention.

EXAMPLE 3

| | |
|---|---|
| Reactive dye (C.I. Reactive Blue 72) | 13 parts |
| Thiodiglycol | 25 parts |
| Triethylene glycol monomethyl ether | 4 parts |
| Water | 58 parts |

All the above components were mixed. The aqueous mixture obtained was adjusted to pH 7.9 using sodium hydroxide, and stirred for 2 hours, followed by filtration using Fluoropore Filter FP-100 (trade name; available from Sumitomo Electric Industries, Ltd.) to provide water-based ink (3) of the present invention.

COMPARATIVE EXAMPLE 1

| | |
|---|---|
| Reactive dye (C.I. Reactive Yellow 1), dichlorotriazine type | 10 parts |
| Thiodiglycol | 26 parts |
| Diethylene glycol | 9 parts |
| Water | 55 parts |

Example 1 was repeated except for using all the above components, to provide water-based ink (4) of a comparative example.

COMPARATIVE EXAMPLE 2

| | |
|---|---|
| Reactive dye (C.I. Reactive Yellow 95) | 8 parts |
| Thiodiglycol | 26 parts |
| Glycerol | 9 parts |
| Water | 57 parts |

Example 1 was repeated except for using all the above components, to provide water-based ink (5) of a comparative example.

COMPARATIVE EXAMPLE 3

| | |
|---|---|
| Reactive dye (C.I. Reactive Red 24) | 8 parts |
| Triethylene glycol | 16 parts |
| Diethylene glycol | 10 parts |
| Tetraethylene glycol dimethyl ether | 4 parts |
| Water | 62 parts |

Example 2 was repeated except for using all the above components, to provide water-based ink (6) of a comparative example.

USE EXAMPLE

With use of the water-based inks (1) to (6) of Examples 1 to 3 and Comparative Examples 1 to 3, characters were continuously printed through 10 nozzles at $5\times10^8$ pulses, using a head (nozzle number: 256; flying droplet: 20 to 40 pl) for a color bubble-jet copying machine Pixel pro (trade name; manufactured by Canon Inc.), which was an ink-jet head operated by the action of a heat energy as disclosed in Japanese Patent Application Laid-open No. 54-59936. The printing was thus carried out to examine whether or not the nozzles clogged and whether or not the quantity of ejected droplets and the rate of ejection decreased. Through the same head, English characters and numerals were also continuously printed for 3 minutes and then the printing was stopped. After the head was left to stand for 3 minutes in an uncapped state in a low-humidity environment of a temperature of 20° C. and a humidity of 30%, English characters and numerals were again printed to examine whether or not there occurred blurred characters, characters with unsharp edges, etc. Through the same head, English characters and numerals were further continuously printed for 3 minutes and then the printing was stopped. Then the head was left to stand for 3 days in an uncapped state to examine whether or not the nozzles clogged because of deposition of solid matters in the vicinity of their tips (in all instances, the head was used at a temperature raised within the range of from 45° to 60° C.). To further examine ink storage stability, the water-based inks (1) to (6) were each put in a glass bottle in a quantity of 100 cc and stored at 40° C. for 3 days. Results of evaluation of the inks are shown in Table 1.

Of the inks of Examples 1 to 3 and Comparative Examples 1 to 3, the inks (1), (2) and (3) were put together as ink set 1, and the inks (4), (5) and (6) as ink set 2. Each ink set was loaded into a color bubble-jet copying machine Pixel pro (trade name; manufactured by Canon Inc.), and a print was made on a cotton-100% georgette cloth having been subjected to alkali treatment, and the print was fixed by steaming at 100° C. for 2 minutes, followed by washing with a synthetic detergent. Sharpness and bleeding properties of dyed articles were evaluated. Results obtained are shown in Table 2. (For each ink, the print was so made as to provide a 2×10 cm solid print sample under conditions of an ink shot quantity of 16 nl/mm$^2$ and to have monochrome areas and mixed-color areas).

TABLE 1

| | | Examples | | | Comparative Examples | | |
|---|---|---|---|---|---|---|---|
| Evaluation items | Ink: | (1) | (2) | (3) | (4) | (5) | (6) |
| Ejection stability*1: | | A | A | A | B | A | C |
| Ejection response*2: | | A | A | A | C | C | C |
| Deposits at nozzle tips*3: | | A | A | A | B | A | A |
| Storage stability*4: | | A | A | A | C | A | B |

*1: Number of nozzles at which no nozzle clogged and neither the quantity of ejected droplets nor the rate of ejection decreased when characters were continuously printed through 10 nozzles at 5 × 10$^8$ pulses.
A: 10 nozzles
B: 6 to 9 nozzles
C: 5 or less nozzles
*2: After characters were continuously printed for 3 minutes, the head was left to stand for 3 minutes in an uncapped state in a low-humidity environment of a temperature of 20° C. and a humidity of 30% and then characters were again printed.
A: No defective print was seen on the first and subsequent characters.
B: Part of the first character was faded or had unsharp edges.
C: Printing was quite impossible from the beginning.
*3: The state of clogging due to deposition of solid matters in the vicinity of nozzle tips when, after characters were continuously printed for 3 minutes, the head was left to stand for 3 days in an uncapped state.
A: No clogging.
B: Nozzles clogged, but were restored by suction.
C: Clogged nozzles were not restored even by suction.
*4: Visual judgement on whether or not foreign matters appeared in a glass bottle after the ink was stored at 40° C. for 3 days.
A: No foreign matters.
B: Foreign matters slightly appeared.
C: Foreign matters greatly appeared.

TABLE 2

| | | Examples | | | Comparative Examples | |
|---|---|---|---|---|---|---|
| Evaluation items | Ink: | (1) | (2) | (3) | (5) | (6) |
| Sharpness*5: | | A | A | A | A | C |
| | | Ink set 1 (Inks 1, 2, 3) | | | Ink set 2 (Inks 4, 5, 6) | |
| Bleeding*6: | | A | | | B | |

*5: Judgment on the sharpness of patterns at monochrome areas when observed with the naked eye.
A: Good.
B: Slightly poor.
C: Poor.
*6: Any bleedings at the boundaries of mixed-color areas were observed with the naked eye.
A: Good.
B: Slightly poor.
C: Poor.

EXAMPLE 4

| | |
|---|---|
| Reactive dye (C.I. Reactive Yellow 95) | 10 parts |
| Thiodiglycol | 25 parts |
| Diethylene glycol | 10 parts |
| Calcium chloride | 0.002 part |

-continued

| | |
|---|---|
| Water | 55 parts |

All of the above components were mixed. The aqueous mixture obtained was adjusted to pH 8.1 using sodium hydroxide, and stirred for 2 hours, followed by filtration using Fluoropore Filter FP-100 (trade name; available from Sumitomo Electric Industries, Ltd.) to provide water-based ink (7) of the present invention.

EXAMPLE 5

| | |
|---|---|
| Reactive dye (C.I. Reactive Yellow 95) | 10 parts |
| Thiodiglycol | 29 parts |
| Triethylene glycol | 3 parts |
| Tetraethylene glycol dimethyl ether | 3 parts |
| Magnesium sulfate | 0.002 part |
| Water | 55 parts |

Example 4 was repeated except for using all the above components, to provide water-based ink (8) of the present invention.

EXAMPLE 6

| | |
|---|---|
| Reactive dye (C.I. Reactive Yellow 2) | 10 parts |
| Thiodiglycol | 24 parts |
| Diethylene glycol | 2 parts |
| Triethylene glycol monoethyl ether | 4 parts |
| Calcium chloride | 0.001 part |
| Magnesium sulfate | 0.001 part |
| Water | 60 parts |

Example 4 was repeated except for using all the above components, to provide water-based ink (9) of the present invention.

COMPARATIVE EXAMPLE 4

| | |
|---|---|
| Reactive dye (C.I. Reactive Yellow 95) | 8 parts |
| Thiodiglycol | 25 parts |
| Propylene glycol | 10 parts |
| Calcium chloride | 0.001 part |
| Magnesium sulfate | 0.001 part |
| Water | 57 parts |

Example 4 was repeated except for using all the above components, to provide water-based ink (10) of a comparative example.

COMPARATIVE EXAMPLE 5

| | |
|---|---|
| Reactive dye (C.I. Reactive Yellow 1), dichlorotriazine type | 10 parts |
| Thiodiglycol | 25 parts |
| Diethylene glycol | 10 parts |
| Calcium chloride | 0.001 part |
| Magnesium sulfate | 0.001 part |
| Water | 55 parts |

Example 4 was repeated except for using all the above components, to provide water-based ink (11) of a comparative example.

USE EXAMPLE

With use of the water-based inks (7) to (11) of Examples 4 to 6 and Comparative Examples 4 and 5, characters were continuously printed through 10 nozzles at 5×10$^8$ pulses, using a head (nozzle number: 256; flying droplet: 20 to 40 pl) for a color bubble-jet copying machine Pixel pro (trade name; manufactured by Canon Inc.), which was an ink-jet head operated by the action of a heat energy as disclosed in Japanese Patent Application Laid-open No. 54-59936. The printing was thus carried out to examine whether or not the nozzles clogged and whether or not the quantity of ejected droplets and the rate of ejection decreased. Through the same head, English characters and numerals were also continuously printed for 3 minutes and then the printing was stopped. After the head was left to stand for 3 minutes in an uncapped state, English characters and numerals were again printed to examine whether or not there occurred blurred characters, characters with unsharp edges, etc. Through the same head, English characters and numerals were further continuously printed for 3 minutes and then the printing was stopped. Then the head was left to stand for 3 days in an uncapped state to examine whether or not the nozzles clogged because of deposition of solid matters in the vicinity of their tips (in all instances, the head was used at a temperature raised within the range of from 45° to 60° C.). To further examine ink storage stability, the water-based inks (7) to (11) were each put in a glass bottle in a quantity of 100 cc and stored at 40° C. for 3 days. Results of evaluation of the inks are shown in Table 3.

The water-based inks (7) to (9) of Examples 4 to 6 were each loaded into a color bubble-jet copying machine Pixel pro (trade name; manufactured by Canon Inc.), and a print was made on a cotton-100% georgette cloth having been subjected to alkali treatment, and the print was fixed by steaming at 100° C. for 2 minutes, followed by washing with a synthetic detergent. As a result, sharp printed articles were obtained. (The print was so made as to provide a 2×10 cm solid print sample under conditions of an ink shot quantity of 16 nl/mm$^2$).

| | | Examples | | | Comparative Examples | |
|---|---|---|---|---|---|---|
| Evaluation items | Ink: | (7) | (8) | (9) | (10) | (11) |
| Ejection stability*1: | | A | A | A | A | B |
| Ejection response*2: 156 | | A | A | A | C | C |
| Deposits at nozzle tips*3: | | A | A | A | A | B |
| Storage stability*4: | | A | A | A | A | C |

EXAMPLE 7

| | |
|---|---|
| Reactive dye (C.I. Reactive Red 24) | 10 parts |
| Thiodiglycol | 15 parts |
| Diethylene glycol | 15 parts |
| Calcium chloride | 0.002 part |
| Water | 60 parts |

All the above components were mixed. The aqueous mixture obtained was adjusted to pH 7.8 using sodium hydroxide, and stirred for 2 hours, followed by filtration using Fluoropore Filter FP-100 (trade name; available from Sumitomo Electric Industries, Ltd.) to provide water-based ink (12) of the present invention.

EXAMPLE 8

| | |
|---|---|
| Reactive dye (C.I. Reactive Red 24) | 10 parts |
| Thiodiglycol | 20 parts |
| Diethylene glycol | 6 parts |
| Tetraethylene glycol diethyl ether | 4 parts |
| Magnesium sulfate | 0.002 part |
| Water | 60 parts |

Example 7 was repeated except for using all the above components, to provide water-based ink (13) of the present invention.

EXAMPLE 9

| | |
|---|---|
| Reactive dye (C.I. Reactive Red 45) | 10 parts |
| Thiodiglycol | 25 parts |
| Diethylene glycol | 2 parts |
| Triethylene glycol monomethyl ether | 3 parts |
| Calcium chloride | 0.001 part |
| Magnesium chloride | 0.001 part |
| Water | 60 parts |

Example 7 was repeated except for using all the above components, to provide water-based ink (14) of the present invention.

COMPARATIVE EXAMPLE 6

| | |
|---|---|
| Reactive dye (C.I. Reactive Red 24) | 9 parts |
| Thiodiglycol | 20 parts |
| Glycerol | 10 parts |
| Calcium chloride | 0.001 part |
| Magnesium sulfate | 0.001 part |
| Water | 61 parts |

Example 7 was repeated except for using all the above components, to provide water-based ink (15) of a comparative example.

COMPARATIVE EXAMPLE 7

| | |
|---|---|
| Reactive dye (C.I. Reactive Red 2), dichlorotriazine type | 10 parts |
| Thiodiglycol | 25 parts |
| Diethylene glycol | 2 parts |
| Triethylene glycol monomethyl ether | 3 parts |
| Calcium chloride | 0.001 part |
| Magnesium sulfate | 0.001 part |
| Water | 60 parts |

Example 7 was repeated except for using all the above components, to provide water-based ink (16) of a comparative example.

USE EXAMPLE

With use of the water-based inks (12) to (16) of Examples 7 to 9 and Comparative Examples 6 and 7, characters were continuously printed through 10 nozzles at $5\times10^8$ pulses, using a head (nozzle number: 256; flying droplet: 20 to 40 pl) for a color bubble-jet copying machine Pixel pro (trade name; manufactured by Canon Inc.), which was an ink-jet head operated by the action of a heat energy as disclosed in Japanese Patent Application Laid-open No. 54-59936. The printing was thus carried out to examine whether or not the nozzles clogged and whether or not the quantity of ejected droplets and the rate of ejection decreased. Through the same head, English characters and numerals were also continuously printed for 3 minutes and then the printing was stopped. After the head was left to stand for 3 minutes in an uncapped state, English characters and numerals were again printed to examine whether or not there occurred blurred characters, characters with unsharp edges, etc. Through the same head, English characters and numerals were further continuously printed for 3 minutes and then the printing was stopped. Then the head was left to stand for 3 days in an uncapped state to examine whether or not the nozzles clogged because of deposition of solid matters in the vicinity of their tips (in all instances, the head was used at a temperature raised within the range of from 45° to 60° C.). To further examine ink storage stability, the water-based inks (12) to (16) were each put in a glass bottle in a quantity of 100 cc and stored at 40° C. for 3 days. Results of evaluation of the inks are shown in Table 4.

The water-based inks (12) to (14) of Examples 7 to 9 were each loaded into a color bubble-jet copying machine Pixel pro (trade name; manufactured by Canon Inc.), and a print was made on a cotton-100% georgette cloth having been subjected to alkali treatment, and the print was fixed by steaming at 100° C. for 2 minutes, followed by washing with a synthetic detergent. As a result, sharp printed articles were obtained. (The print was so made as to provide a 2×10 cm solid print sample under conditions of an ink shot quantity of 16 nl/mm$^2$).

TABLE 4

| | | Examples | | | Comparative Examples | |
|---|---|---|---|---|---|---|
| Evaluation items | Ink: | (12) | (13) | (14) | (15) | (16) |
| Ejection stability*1: | | A | A | A | A | B |
| Ejection response*2: | | A | A | A | C | C |
| Deposits at nozzle tips*3: | | A | A | A | A | B |
| Storage stability*4: | | A | A | A | A | C |

EXAMPLE 10

| | |
|---|---|
| Reactive dye (C.I. Reactive Blue 72) | 13 parts |
| Thiodiglycol | 21 parts |
| Dipropylene glycol | 4 parts |
| Magnesium sulfate | 0.002 part |
| Water | 62 parts |

All the above components were mixed. The aqueous mixture obtained was adjusted to pH 7.9 using sodium hydroxide, and stirred for 2 hours, followed by filtration using Fluoropore Filter FP-100 (trade name; available from Sumitomo Electric Industries, Ltd.) to provide water-based ink (17) of the present invention.

EXAMPLE 11

| | |
|---|---|
| Reactive dye (C.I. Reactive Blue 15) | 13 parts |
| Thiodiglycol | 20 parts |
| Tripropylene glycol | 4 parts |
| Calcium chloride | 0.001 part |
| Magnesium chloride | 0.001 part |
| Water | 63 parts |

Example 10 was repeated except for using all the above components, to provide water-based ink (18) of the present invention.

COMPARATIVE EXAMPLE 8

| | |
|---|---|
| Reactive dye (C.I. Reactive Blue 72) | 6 parts |
| Thiodiglycol | 25 parts |
| Diethylene glycol monobutyl ether | 4 parts |
| Calcium chloride | 0.001 part |
| Magnesium sulfate | 0.001 part |
| Water | 65 parts |

Example 10 was repeated except for using all the above components, to provide water-based ink (19) of a comparative example.

COMPARATIVE EXAMPLE 9

| | |
|---|---|
| Reactive dye (C.I. Reactive Blue 140), dichlorotriazine type | 13 parts |
| Thiodiglycol | 20 parts |
| Triethylene glycol monomethyl ether | 4 parts |
| Calcium chloride | 0.001 part |
| Magnesium chloride | 0.001 part |
| Water | 63 parts |

Example 10 was repeated except for using all the above components, to provide water-based ink (20) of a comparative example.

USE EXAMPLE

With use of the water-based inks (17) to (20) of Examples 10 and 11 and Comparative Examples 8 and 9, characters were continuously printed through 10 nozzles at $5\times10^8$ pulses, using a head (nozzle number: 256; flying droplet: 20 to 40 pl) for a color bubble-jet copying machine Pixel pro (trade name; manufactured by Canon Inc.), which was an ink-jet head operated by the action of a heat energy as disclosed in Japanese Patent Application Laid-open No. 54-59936. The printing was thus carried out to examine whether or not the nozzles clogged and whether or not the quantity of ejected droplets and the rate of ejection decreased. Through the same head, English characters and numerals were also continuously printed for 3 minutes and then the printing was stopped. After the head was left to stand for 3 minutes in an uncapped state, English characters and numerals were again printed to examine whether or not there occurred blurred characters, characters with unsharp edges, etc. Through the same head, English characters and numerals were further continuously printed for 3 minutes and then the printing was stopped. Then the head was left to stand for 3 days in an uncapped state to examine whether or not the nozzles clogged because of deposition of solid matters in the vicinity of their tips (in all instances, the head was used at a temperature raised within the range of from 45° to 60° C.). To further examine ink storage stability, the water-based inks (17) to (20) were each put in a glass bottle in a quantity of 100 cc and stored at 40° C. for 3 days. Results of evaluation of the inks are shown in Table 5.

The water-based inks (17) and (18) of Examples 10 and 11 were each loaded into a color bubble-jet copying machine Pixel pro (trade name; manufactured by Canon Inc.), and a print was made on a cotton-100% georgette cloth having been subjected to alkali treatment, and the print was fixed by steaming at 100° C. for 2 minutes, followed by washing with a synthetic detergent. As a result, sharp printed articles were obtained. (The print was so made as to provide a 2×10 cm solid print sample under conditions of an ink shot quantity of 16 nl/mm$^2$).

TABLE 5

| | | Examples | | Comparative Examples | |
|---|---|---|---|---|---|
| Evaluation items | Ink: | (17) | (18) | (19) | (20) |
| Ejection stability*1: | | A | A | A | B |
| Ejection response*2: | | A | A | C | C |
| Deposits at nozzle tips*3: | | A | A | A | B |
| Storage stability*4: | | A | A | A | C |

EXAMPLE 12

| | |
|---|---|
| Reactive dye (C.I. Reactive Blue 49) | 10 parts |
| Thiodiglycol | 20 parts |
| Tetraethylene glycol dimethyl ether | 4 parts |
| Magnesium sulfate | 0.002 part |
| Water | 66 parts |

All the above components were mixed. The aqueous mixture obtained was adjusted to pH 8.2 using sodium hydroxide, and stirred for 2 hours, followed by filtration using Fluoropore Filter FP-100 (trade name; available from Sumitomo Electric Industries, Ltd.) to provide water-based ink (21) of the present invention.

EXAMPLE 13

| | |
|---|---|
| Reactive dye (C I. Reactive Blue 19) | 9 parts |
| Thiodiglycol | 20 parts |
| Diethylene glycol | 3 parts |
| Triethylene glycol monomethyl ether | 3 parts |
| Calcium chloride | 0.001 part |
| Magnesium chloride | 0.001 part |
| Water | 65 parts |

Example 12 was repeated except for using all the above components, to provide water-based ink (22) of the present invention.

EXAMPLE 14

| | |
|---|---|
| Reactive dye (C.I. Reactive Blue 38) | 10 parts |
| Thiodiglycol | 23 parts |
| Diethylene glycol | 4 parts |
| Isopropyl alcohol | 3 parts |
| Calcium chloride | 0.001 part |
| Magnesium chloride | 0.001 part |
| Water | 60 parts |

Example 12 was repeated except for using all the above components, to provide water-based ink (23) of the present invention.

COMPARATIVE EXAMPLE 10

| | |
|---|---|
| Reactive dye (C.I Reactive Blue 49) | 9 parts |
| Diethylene glycol | 24 parts |
| Calcium chloride | 0.001 part |
| Magnesim chloride | 0.001 part |
| Water | 67 parts |

Example 12 was repeated except for using all the above components, to provide water-based ink (24) of a comparative example.

COMPARATIVE EXAMPLE 11

| | |
|---|---|
| Reactive dye (C.I Reactive Blue 4), dichlorotriazine type | 10 parts |

-continued

| | |
|---|---|
| Thiodiglycol | 20 parts |
| Tetraethylene glycol dimethyl ether | 4 parts |
| Calcium chloride | 0.001 part |
| Magnesium chloride | 0.001 part |
| Water | 66 parts |

Example 12 was repeated except for using all the above components, to provide water-based ink (25) of a comparative example.

USE EXAMPLE

With use of the water-based inks (21) to (25) of Examples 12 to 14 and Comparative Examples 10 and 11, characters were continuously printed through 10 nozzles at $5\times10^8$ pulses, using a head (nozzle number: 256; flying droplet: 20 to 40 pl) for a color bubble-jet copying machine Pixel pro (trade name; manufactured by Canon Inc.), which was an ink-jet head operated by the action of a heat energy as disclosed in Japanese Patent Application Laid-open No. 54-59936. The printing was thus carried out to examine whether or not the nozzles clogged and whether or not the quantity of ejected droplets and the rate of ejection decreased. Through the same head, English characters and numerals were also continuously printed for 3 minutes and then the printing was stopped. After the head was left to stand for 3 minutes in an uncapped state, English characters and numerals were again printed to examine whether or not there occurred blurred characters, characters with unsharp edges, etc. Through the same head, English characters and numerals were further continuously printed for 3 minutes and then the printing was stopped. Then the head was left to stand for 3 days in an uncapped state to examine whether or not the nozzles clogged because of deposition of solid matters in the vicinity of their tips (in all instances, the head was used at a temperature raised within the range of from 45° to 60° C.). To further examine ink storage stability, the water-based inks (21) to (25) were each put in a glass bottle in a quantity of 100 cc and stored at 40° C. for 3 days. Results of evaluation of the inks are shown in Table 6.

The water-based inks (21) to (23) of Examples 12 to 14 were each loaded into a color bubble-jet copying machine Pixel pro (trade name; manufactured by Canon Inc.), and a print was made on a cotton-100% georgette cloth having been subjected to alkali treatment, and the print was fixed by steaming at 100° C. for 2 minutes, followed by washing with a synthetic detergent. As a result, sharp printed articles were obtained. (The print was so made as to provide a $2\times10$ cm solid print sample under conditions of an ink shot quantity of 16 nl/mm$^2$).

TABLE 6

| | | Examples | | | Comparative Examples | |
|---|---|---|---|---|---|---|
| Evaluation items | Ink: | (21) | (22) | (23) | (24) | (25) |
| Ejection stability*1: | | A | A | A | B | B |
| Ejection response*2: | | A | A | A | C | C |
| Deposits at nozzle tips*3: | | A | A | A | A | B |
| Storage stability*4: | | A | A | A | A | C |

EXAMPLE 15

| | |
|---|---|
| Reactive dye (C.I. Reactive Black 5) | 13 parts |

-continued

| | |
|---|---|
| Thiodiglycol | 15 parts |
| Diethylene glycol | 15 parts |
| Calcium chloride | 0.002 part |
| Water | 57 parts |

All the above components were mixed. The aqueous mixture obtained was adjusted to pH 7.7 using sodium hydroxide, and stirred for 2 hours, followed by filtration using Fluoropore Filter FP-100 (trade name; available from Sumitomo Electric Industries, Ltd.) to provide water-based ink (26) of the present invention.

EXAMPLE 16

| | |
|---|---|
| Reactive dye (C.I. Reactive Black 8) | 13 parts |
| Thiodiglycol | 25 parts |
| Diethylene glycol | 3 parts |
| Tetraethylene glycol dimethyl ether | 4 parts |
| Calcium chloride | 0.001 part |
| Magnesium sulfate | 0.001 part |
| Water | 55 parts |

Example 15 was repeated except for using all the above components, to provide water-based ink (27) of the present invention.

EXAMPLE 17

| | |
|---|---|
| Reactive dye (C.I. Reactive Black 31) | 9 parts |
| Thiodiglycol | 20 parts |
| Diethylene glycol | 3 parts |
| Triethylene glycol monomethyl ether | 3 parts |
| Magnesium chloride | 0.001 part |
| Magnesium sulfate | 0.001 part |
| Water | 65 parts |

Example 15 was repeated except for using all the above components, to provide water-based ink (28) of the present invention.

COMPARATIVE EXAMPLE 12

| | |
|---|---|
| Reactive dye (C.I. Reactive Black 5) | 9 parts |
| Thiodiglycol | 15 parts |
| Glycerol | 15 parts |
| Calcium chloride | 0.001 part |
| Magnesium sulfate | 0.001 part |
| Water | 61 parts |

Example 15 was repeated except for using all the above components, to provide water-based ink (29) of a comparative example.

COMPARATIVE EXAMPLE 13

| | |
|---|---|
| Reactive dye (C.I. Reactive Black 8) | 9 parts |
| Diethylene glycol | 28 parts |
| Tetraethylene glycol dimethyl ether | 4 parts |
| Calcium chloride | 0.001 part |
| Magnesium sulfate | 0.001 part |
| Water | 59 parts |

Example 15 was repeated except for using all the above components, to provide water-based ink (30) of a comparative example.

USE EXAMPLE

With use of the water-based inks (26) to (30) of Examples 15 to 17 and Comparative Examples 12 and 13, characters were continuously printed through 10 nozzles at $5\times10^8$ pulses, using a head (nozzle number: 256; flying droplet: 20 to 40 pl) for a color bubble-jet copying machine Pixel pro (trade name; manufactured by Canon Inc.), which was an ink-jet head operated by the action of a heat energy as disclosed in Japanese Patent Application Laid-open No. 54-59936. The printing was thus carried out to examine whether or not the nozzles clogged and whether or not the quantity of ejected droplets and the rate of ejection decreased. Through the same head, English characters and numerals were also continuously printed for 3 minutes and then the printing was stopped. After the head was left to stand for 3 minutes in an uncapped state, English characters and numerals were again printed to examine whether or not there occurred blurred characters, characters with unsharp edges, etc. Through the same head, English characters and numerals were further continuously printed for 3 minutes and then the printing was stopped. Then the head was left to stand for 3 days in an uncapped state to examine whether or not the nozzles clogged because of deposition of solid matters in the vicinity of their tips (in all instances, the head was used at a temperature raised within the range of from 45° to 60° C.). To further examine ink storage stability, the water-based inks (26) to (30) were each put in a glass bottle in a quantity of 100 cc and stored at 40° C. for 3 days. Results of evaluation of the inks are shown in Table 7.

The water-based inks (26) to (28) of Examples 15 to 17 were each loaded into a color bubble-jet copying machine Pixel pro (trade name; manufactured by Canon Inc.), and a print was made on a cotton-100% georgette cloth having been subjected to alkali treatment, and the print was fixed by steaming at 100° C. for 2 minutes, followed by washing with a synthetic detergent. As a result, sharp printed articles were obtained. (The print was so made as to provide a $2\times10$ cm solid print sample under conditions of an ink shot quantity of 16 $nl/mm^2$).

TABLE 7

| | | Examples | | | Comparative Examples | |
|---|---|---|---|---|---|---|
| Evaluation items | Ink: | (26) | (27) | (28) | (29) | (30) |
| Ejection stability*1: | | A | A | A | A | C |
| Ejection response*2: | | A | A | A | C | C |
| Deposits at nozzle tips*3: | | A | A | A | A | A |
| Storage stability*4: | | A | A | A | A | B |

EXAMPLE 18

| | |
|---|---|
| Reactive dye (C.I. Reactive Orange 5) | 10 parts |
| Thiodiglycol | 20 parts |
| Diethylene glycol | 10 parts |
| Calcium chloride | 0.002 part |
| Water | 60 parts |

All the above components were mixed. The aqueous mixture obtained was adjusted to pH 7.5 using sodium hydroxide, and stirred for 2 hours, followed by filtration using Fluoropore Filter FP-100 (trade name; available from Sumitomo Electric Industries, Ltd.) to provide water-based ink (31) of the present invention.

EXAMPLE 19

| | |
|---|---|
| Reactive dye (C.I. Reactive Orange 12) | 10 parts |
| Thiodiglycol | 15 parts |
| Diethylene glycol | 15 parts |
| Magnesium sulfate | 0.002 part |
| Water | 60 parts |

Example 18 was repeated except for using all the above components, to provide water-based ink (32) of the present invention.

EXAMPLE 20

| | |
|---|---|
| Reactive dye (C.I. Reactive Orange 35) | 13 parts |
| Thiodiglycol | 25 parts |
| Diethylene glycol | 3 parts |
| Tetraethylene glycol dimethyl ether | 4 parts |
| Calcium chloride | 0.001 part |
| Magnesium sulfate | 0.001 part |
| Water | 55 parts |

Example 18 was repeated except for using all the above components, to provide water-based ink (33) of the present invention.

COMPARATIVE EXAMPLE 14

| | |
|---|---|
| Reactive dye (C.I. Reactive Orange 12) | 9 parts |
| Diethylene glycol | 15 parts |
| Triethylene glycol monomethyl ether | 15 parts |
| Calcium chloride | 0.001 part |
| Magnesium sulfate | 0.001 part |
| Water | 61 parts |

Example 18 was repeated except for using all the above components, to provide water-based ink (34).

COMPARATIVE EXAMPLE 15

| | |
|---|---|
| Reactive dye (C.I. Reactive Orange 4), dichlorotriazine type | 10 parts |
| Thiodiglycol | 20 parts |
| Diethylene glycol | 10 parts |
| Calcium chloride | 0.002 part |
| Water | 60 parts |

Example 18 was repeated except for using all the above components, to provide water-based ink (35) of a comparative example.

USE EXAMPLE

With use of the water-based inks (31) to (35) of Examples 18 to 20 and Comparative Examples 14 and 15, characters were continuously printed through 10 nozzles at $5\times10^8$ pulses, using a head (nozzle number: 256; flying droplet: 20 to 40 pl) for a color bubble-jet copying machine Pixel pro (trade name; manufactured by Canon Inc.), which was an ink-jet head operated by the action of a heat energy as disclosed in Japanese Patent Application Laid-open No. 54-59936. The printing was thus carried out to examine whether or not the nozzles clogged and whether or not the quantity of ejected droplets and the rate of ejection decreased. Through the same head, English characters and numerals were also continuously printed for 3 minutes and then the printing was stopped. After the head was left to stand for 3 minutes in an uncapped state, English characters and numerals were again printed to examine whether or not there occurred blurred characters, characters with unsharp edges, etc. Through the same head, English characters and numerals were further continuously printed for 3 minutes and then the printing was stopped. Then the head was left to stand for 3 days in an uncapped state to examine whether or not the nozzles clogged because of deposition of solid matters in the vicinity of their tips (in all instances, the head was used at a temperature raised within the range of from 45° to 60° C.). To further examine ink storage stability, the water-based inks (31) to (35) were each put in a glass bottle in a quantity of 100 cc and stored at 40° C. for 3 days. Results of evaluation of the inks are shown in Table 8.

The water-based inks (31) to (35) of Examples 18 to 20 and Comparative Examples 14 and 15 were each loaded into a color bubble-jet copying machine Pixel pro (trade name; manufactured by Canon Inc.), and a print was made on a cotton-100% georgette cloth having been subjected to alkali treatment, and the print was fixed by steaming at 100° C. for 2 minutes, followed by washing with a synthetic detergent. Sharpness and bleeding properties of dyed articles were evaluated. Results obtained are shown in Table 9. (The print was so made as to provide a 2×10 cm solid print sample under conditions of an ink shot quantity of 16 nl/mm²).

TABLE 8

| | | Examples | | | Comparative Examples | |
|---|---|---|---|---|---|---|
| Evaluation items | Ink: | (31) | (32) | (33) | (34) | (35) |
| Ejection stability*1: | | A | A | A | B | C |
| Ejection response*2: | | A | A | A | C | C |
| Deposits at nozzle tips*3: | | A | A | A | B | B |
| Storage stability*4: | | A | A | A | B | C |

TABLE 9

| | | Examples | | | Comparative Examples | |
|---|---|---|---|---|---|---|
| Evaluation items | Ink: | (31) | (32) | (33) | (34) | (35) |
| Sharpness*7: | | A | A | A | B | C |
| Bleeding properties*8: | | A | A | A | C | C |

*7: Judgment on the sharpness of patterns when observed with the naked eye.
A: Good.
B: Slightly poor.
C: Poor.
*8: Observed with the naked eye.
A: Good.
B: Slightly poor.
C: Poor.

EXAMPLE 21

| | |
|---|---|
| Reactive dye (C.I. Reactive Brown 7) | 10 parts |
| Thiodiglycol | 20 parts |
| Diethylene glycol | 10 parts |
| Calcium chloride | 0.002 part |
| Water | 60 parts |

All the above components were mixed. The aqueous mixture obtained was adjusted to pH 7.5 using sodium hydroxide, and stirred for 2 hours, followed by filtration using Fluoropore Filter FP-100 (trade name; available from Sumitomo Electric Industries, Ltd.) to provide water-based ink (36) of the present invention.

EXAMPLE 22

| | |
|---|---|
| Reactive dye (C.I. Reactive Brown 33) | 13 parts |
| Thiodiglycol | 25 parts |
| Diethylene glycol | 3 parts |
| Tetraethylene glycol dimethyl ether | 4 parts |
| Calcium chloride | 0.001 part |
| Magnesium sulfate | 0.001 part |
| Water | 55 parts |

Example 21 was repeated except for using all the above components, to provide water-based ink (37) of the present invention.

EXAMPLE 23

| | |
|---|---|
| Reactive dye (C.I. Reactive Brown 11) | 2 parts |
| Reactive dye (C.I. Reactive Orange 12) | 1.5 parts |
| Reactive dye (C.I. Reactive Black 39) | 6.5 parts |
| Thiodiglycol | 15 parts |
| Diethylene glycol | 15 parts |
| Magnesium chloride | 0.001 part |
| Magnesium sulfate | 0.001 part |
| Water | 60 parts |

Example 21 was repeated except for using all the above components, to provide water-based ink (38) of the present invention.

COMPARATIVE EXAMPLE 16

| | |
|---|---|
| Reactive dye (C.I. Reactive Brown 11) | 9 parts |
| Diethylene glycol | 30 parts |
| Triethylene glycol monomethyl ether | 6 parts |
| Calcium chloride | 0.001 part |
| Magnesium sulfate | 0.001 part |
| Water | 55 parts |

Example 21 was repeated except for using all the above components, to give water-based ink (39).

COMPARATIVE EXAMPLE 17

| | |
|---|---|
| Reactive dye (C.I. Reactive Brown 10), dichlorotriazine type | 10 parts |
| Thiodiglycol | 20 parts |
| Diethylene glycol | 10 parts |
| Calcium chloride | 0.002 part |
| Water | 60 parts |

Example 21 was repeated except for using all the above components, to give water-based ink (40) of a comparative example.

USE EXAMPLE

With use of the water-based inks (36) to (40) of Examples 21 to 23 and Comparative Examples 16 and 17, characters were continuously printed through 10 nozzles at $5\times10^8$ pulses using a head (nozzle number: 256; flying droplet: 20 to 40 pl) for a color bubble-jet copying machine Pixel pro (trade name; manufactured by Canon Inc.), which was an ink-jet head operated by the action of a heat energy as disclosed in Japanese Patent Application Laid-open No. 54-59936. The printing was thus carried out to examine whether or not the nozzles clogged and whether or not the quantity of ejected droplets and the rate of ejection decreased. Through the same head, English characters and numerals were also continuously printed for 3 minutes and then the printing was stopped. After the head was left to stand for 3 minutes in an uncapped state, English characters and numerals were again printed to examine whether or not there occurred blurred characters, characters with unsharp edges, etc. Through the same head, English characters and numerals were further continuously printed for 3 minutes and then the printing was stopped. Then the head was left to stand for 3 days in an uncapped state to examine whether or not the nozzles clogged because of deposition of solid matters in the vicinity of their tips (in all instances, the head was used at a temperature raised within the range of from 45° to 60° C.). To further examine ink storage stability, the water-based inks (36) to (40) were each put in a glass bottle in a quantity of 100 cc and stored at 40° C. for 3 days. Results of evaluation of the inks are shown in Table 10.

The water-based inks (36) to (40) of Examples 21 to 23 and Comparative Examples 16 and 17 were each loaded into a color bubble-jet copying machine Pixel pro (trade name; manufactured by Canon Inc.), and a print was made on a cotton-100% georgette cloth having been subjected to alkali treatment, and the print was fixed by steaming at 100° C. for 2 minutes, followed by washing with a synthetic detergent. Sharpness and bleeding properties of dyed articles were evaluated. Results obtained are shown in Table 11. (The print was so made as to provide a $2\times10$ cm solid print sample under conditions of an ink shot quantity of 16 nl/mm$^2$).

TABLE 10

| Evaluation items | Ink: | Examples (36) | Examples (37) | Examples (38) | Comparative Examples (39) | Comparative Examples (40) |
|---|---|---|---|---|---|---|
| Ejection stability*1: | | A | A | A | B | C |
| Ejection response*2: | | A | A | A | C | C |
| Deposits at nozzle tips*3: | | A | A | A | B | B |
| Storage stability*4: | | A | A | A | B | C |

TABLE 11

| Evaluation items | Ink: | Examples (36) | Examples (37) | Examples (38) | Comparative Examples (39) | Comparative Examples (40) |
|---|---|---|---|---|---|---|
| Sharpness*7: | | A | A | A | B | C |
| Bleeding properties*8: | | A | A | A | C | C |

EXAMPLE 24

| | |
|---|---|
| Reactive dye (C.I. Reactive Green 8) | 10 parts |
| Thiodiglycol | 20 parts |
| Diethylene glycol | 10 parts |
| Calcium chloride | 0.002 part |
| Water | 60 parts |

All the above components were mixed. The aqueous mixture obtained was adjusted to pH 7.5 using sodium hydroxide, and stirred for 2 hours, followed by filtration using Fluoropore Filter FP-100 (trade name; available from Sumitomo Electric Industries, Ltd.) to provide water-based ink (41) of the present invention.

EXAMPLE 25

| | |
|---|---|
| Reactive dye (C.I. Reactive Green 19) | 13 parts |
| Thiodiglycol | 25 parts |
| Diethylene glycol | 3 parts |

-continued

| | | |
|---|---|---|
| Tetraethylene glycol dimethyl ether | 4 | parts |
| Calcium chloride | 0.001 | part |
| Magnesium sulfate | 0.001 | part |
| Water | 55 | parts |

Example 24 was repeated except for using all the above components, to provide water-based ink (42) of the present invention.

EXAMPLE 26

| | | |
|---|---|---|
| Reactive dye (C.I. Reactive Green 8) | 3 | parts |
| Reactive dye (C.I. Reactive Blue 49) | 8 | parts |
| Thiodiglycol | 15 | parts |
| Diethylene glycol | 15 | parts |
| Magnesium chloride | 0.001 | part |
| Magnesium sulfate | 0.001 | part |
| Water | 59 | parts |

Example 24 was repeated except for using all the above components, to provide water-based ink (43) of the present invention.

COMPARATIVE EXAMPLE 18

| | | |
|---|---|---|
| Reactive dye (C.I. Reactive Green 8) | 9 | parts |
| Diethylene glycol | 30 | parts |
| Triethylene glycol monomethyl ether | 6 | parts |
| Calcium chloride | 0.001 | part |
| Magnesium sulfate | 0.001 | part |
| Water | 55 | parts |

Example 24 was repeated except for using all the above components, to provide water-based ink (44).

COMPARATIVE EXAMPLE 19

| | | |
|---|---|---|
| Reactive dye (C.I. Reactive Green 21), dichlorotriazine type | 10 | parts |
| Thiodiglycol | 20 | parts |
| Diethylene glycol | 10 | parts |
| Calcium chloride | 0.002 | part |
| Water | 60 | parts |

Example 24 was repeated except for using all the above components, to provide water-based ink (45) of a comparative example.

USE EXAMPLE

With use of the water-based inks (41) to (45) of Examples 24 to 26 and Comparative Examples 18 and 19, characters were continuously printed through 10 nozzles at $5\times10^8$ pulses, using a head (nozzle number: 256; flying droplet: 20 to 40 pl) for a color bubble-jet copying machine Pixel pro (trade name; manufactured by Canon Inc.), which was an ink-jet head operated by the action of a heat energy as disclosed in Japanese Patent Application Laid-open No. 54-59936. The printing was thus carried out to examine whether or not the nozzles clogged and whether or not the quantity of ejected droplets and the rate of ejection decreased. Through the same head, English characters and numerals were also continuously printed for 3 minutes and then the printing was stopped. After the head was left to stand for 3 minutes in an uncapped state, English characters and numerals were again printed to examine whether or not there occurred blurred characters, characters with unsharp edges, etc. Through the same head, English characters and numerals were further continuously printed for 3 minutes and then the printing was stopped. Then the head was left to stand for 3 days in an uncapped state to examine whether or not the nozzles clogged because of deposition of solid matters in the vicinity of their tips (in all instances, the head was used at a temperature raised within the range of from 45° to 60° C.). To further examine ink storage stability, the water-based inks (41) to (45) were each put in a glass bottle in a quantity of 100 cc and stored at 40° C. for 3 days. Results of evaluation of the inks are shown in Table 12.

The water-based inks (41) to (45) of Examples 24 to 26 and Comparative Examples 18 and 19 were each loaded into a color bubble-jet copying machine Pixel pro (trade name; manufactured by Canon Inc.), and a print was made on a cotton-100% georgette cloth having been subjected to alkali treatment, and the print was fixed by steaming at 100° C. for 2 minutes, followed by washing with a synthetic detergent. Sharpness and bleeding properties of dyed articles were evaluated. Results obtained are shown in Table 13. The print was so made as to provide a 2×10 cm solid print sample under conditions of an ink shot quantity of 16 nl/mm²).

TABLE 12

| | | Examples | | | Comparative Examples | |
|---|---|---|---|---|---|---|
| Evaluation items | Ink: | (41) | (42) | (43) | (44) | (45) |
| Ejection stability*1: | | A | A | A | B | C |
| Ejection response*2: | | A | A | A | C | C |
| Deposits at nozzle tips*3: | | A | A | A | B | B |
| Storage stability*4: | | A | A | A | B | C |

TABLE 13

| | | Examples | | | Comparative Examples | |
|---|---|---|---|---|---|---|
| Evaluation items | Ink: | (41) | (42) | (43) | (44) | (45) |
| Sharpness*7: | | A | A | A | B | C |
| Bleeding properties*8: | | A | A | A | C | C |

As having been described above, the ink of the present invention makes it possible to obtain bleeding-free, sharp and high-density dyed articles on cloths mainly composed of cellulose fibers. The ink of the present invention also makes it possible in ink-jet textile printing to carry out textile printing which causes no clogging of head nozzles and promises a high reliability for ejection performance. In particular, in the recording of the type the ink is ejected by bubbling ink by the action of a heat energy, textile printing can be carried out in a high quality level of coloring and a high ejection performance even when the ink contains reactive dyes of different color systems.

What is claimed is:

1. A color ink-jet printing method comprising the steps of:

selecting at least two inks from an ink that contains a yellow dye, an ink that contains a red dye, and an ink that contains a cyan dye, wherein any one of said inks comprises from 5% to 30% by weight of a reactive dye having at least one of monochlorotriazine group and a vinyl sulfone group, and a water-based liquid medium, wherein said liquid medium comprises from 1% to 50% by weight of thiodiglyciol and from 2% to 45% by weight of at least one organic solvent selected from a di-, tri or tetramer of oxyethylene, a di-, tri or tetramer of oxypropylene, and a mono- or di-$C_1$–$C_4$-alkyl ether of any of these di-, tri- or tetramers, conducting color ink-jet printing on cellulose fiber containing cloths using said at least two inks so as to form mixed-color areas, and fixing the dyes in said inks to said fibers.

2. The color ink-jet printing method according to claim 1, wherein said yellow dye comprises at least one dye selected from the group consisting of C.I. Reactive Yellow 2, 15, 37, 42, 76 and 95.

3. The color ink-jet printing method according to claim 1, wherein said red dye comprises at least one dye selected from the group consisting of C.I. Reactive Red 24, 31, 45, 218 and 226.

4. The color ink-jet printing method according to claim 1, wherein said cyan dye comprises at least one dye selected from the group consisting of C.I. Reactive Blue 15, 21, 72 and 77.

5. The color ink-jet printing method according to claim 1, wherein said conducting step further includes using an ink that comprises a blue dye.

6. The color ink-jet printing method according to claim 5, wherein said blue dye comprises at least one dye selected from the group consisting of C.I. Reactive Blue 19, 38, 49, 176, 203 and 220.

7. The color ink-jet printing method according to claim 1, wherein said conducting step further includes using an ink that comprises a black dye.

8. The color ink-jet printing method according to claim 7, wherein said black dye comprises at least one dye selected from the group consisting of C.I. Reactive Black 5, 8, 31 and 39.

9. The color ink-jet printing method according to claim 1, wherein said color ink-jet printing method is a method that utilizes thermal energy.

10. A printed material printed by the color ink-jet printing method according to claim 1.

11. The color ink-jet printing method according to claim 1, wherein in said conducting step, at least three of said inks are used so as to form mixed-color areas.

12. The color ink-jet printing method according to claim 11, wherein said yellow dye comprises at least one dye selected from the group consisting of C.I. Reactive Yellow 2, 15, 37, 42, 76 and 95.

13. The color ink-jet printing method according to claim 11, wherein said red dye comprises at least one dye selected from the group consisting of C.I. Reactive Red 24, 31, 45, 218 and 226.

14. The color ink-jet printing method according to claim 11, wherein said cyan dye comprises at least one dye selected from the group consisting of C.I. Reactive Blue 15, 21, 72 and 77.

15. The color ink-jet printing method according to claim 11, wherein said selecting step further includes selecting an ink that contains a blue dye.

16. The color ink-jet printing method according to claim 15, wherein said blue dye comprises at least one dye selected from the group consisting of C.I. Reactive Blue 19, 38, 49, 176, 203 and 220.

17. The color ink-jet printing method according to claim 11, wherein said selecting step further includes selecting an ink that contains a black dye.

18. The color ink-jet printing method according to claim 17, wherein said black dye comprises at least one dye selected from the group consisting of C.I. Reactive Black 5, 8, 31 and 39.

19. The color ink-jet printing method according to claim 11, wherein said color ink-jet printing method is a method that utilizes thermal energy.

20. A printed material printed by the color ink-jet printing method according to claim 11.

21. An ink-set containing at least two ink compositions selected from the following ink compositions for a color ink-jet printing method, said ink-set comprising:

a first component ink composition comprising from 5% to 30% by weight of a reactive dye having at least one of a monochlorotriazine group and a vinyl sulfone group, and a water-based liquid medium, wherein said liquid medium comprises from 1% to 50% by weight of thiodiglycol and from 2% to 45% by weight of at least one organic solvent selected from a di-, tri- or tetramer of oxyethylene, a di-, tri- or tetramer or oxypropylene, and a mono- or di-$C_1$–$C_4$-alkyl ether of any of these di-, tri- or tetramers, and wherein said dye comprises at least one dye selected from the group consisting of C.I. Reactive Yellow 2, 15, 37, 42, 76 and 95;

a second component ink composition comprising from 5% to 30% by weight of a reactive dye having at least one of a monochlorotriazine group and a vinyl sulfone group, and a water-based liquid medium, wherein said liquid medium comprises from 1% to 50% by wight of thiodiglycol and from 2% to 45% by weight of at least one organic solvent selected from a di-, tri- or tetramer of oxyethylene, a di-, tri- or tetramer of oxypropylene, and a mono- or di-$C_1$–$C_4$-alkyl ether of any of these di-, tri- or tetramers, and wherein said dye comprises at least one dye selected from the group consisting of C.I. Reactive Red 24, 31, 45, 218 and 226; and a third component ink composition comprising from 5% to 30% by weight of a reactive dye having at least one of a monochlorotriazine group and a vinyl sulfone group, and a water-based liquid medium, wherein said liquid medium comprises from 1% to 50% by weight of thiodiglycol and from 2% to 45% by weight of at least one organic solvent selected from a di-, tri- or tetramer of oxyethylene, a di-, tri- or tetramer of oxypropylene, and a mono- or di-$C_1$–$C_4$-alkyl ether of any of these di-, tri- or tetramers, and wherein said dye comprises at least one dye selected from the group consisting of C.I. Reactive Blue 15, 21, 72 and 77.

22. The ink-set according to claim 21, further comprising an ink comprising from 5% to 30% by weight of a reactive dye having at least one of a monochlorotriazine group and a vinyl sulfone group, and a water-based liquid medium, wherein said liquid medium comprises from 1% to 50% by weight of thiodiglycol and from 2% to 45% by weight of at least one organic solvent selected from a di-, tri- or tetramer of oxyethylene, a di-, tri or tetramer of oxypropylene, and a mono- or di-$C_1$–$C_4$-alkyl ether of any of these di-, tri- or tetramers, and wherein said dye comprises at least one dye selected from the group consisting of C.I. Reactive Blue 19, 38, 49, 176, 203 and 220.

23. The ink-set according to claim 21, further comprising an ink comprising from 5% to 30% by weight of a reactive dye having at least one of a monochlorotriazine group and a vinyl sulfone group, and a water-based liquid medium, wherein said liquid medium comprises from 1% to 50% by weight of thiodiglycol and from 2% to 45% by weight of at least one organic solvent selected from a di-, tri- or tetramer of oxyethylene, a di-, tri- or tetramer of oxypropylene, and a mono- or di-$C_1$–$C_4$-alkyl ether of any of these di-, tri- or tetramers, and wherein said dye comprises at least one dye selected from the group consisting of C.I. Reactive Black 5, 8, 31 and 39.

24. A color ink-jet printing apparatus comprising a holder that holds an ink-set, and a head having orifices from which an ink constituting said ink-set is ejected in the form of ink droplets, wherein said ink-set is as defined in claim 21.

25. A color ink-jet printing apparatus comprising a holder that holds an ink-set, and a head having orifices from which an ink constituting said ink-set is ejected in the form of ink droplets, wherein said ink-set is as defined in claim 22.

26. A color ink-jet printing apparatus comprising a holder that holds an ink-set, and a head having orifices from which an ink constituting said ink-set is ejected in the form of ink droplets, wherein said ink-set is as defined in claim 23.

* * * * *

UNITED STATES PATENT AND TRADEMARK OFFICE

CERTIFICATE OF CORRECTION

PATENT NO. : 5,358,558

DATED : October 25, 1994

INVENTOR(S) : TOMOYA YAMAMOTO, ET AL.

It is certified that error appears in the above-indentified patent and that said Letters Patent is hereby corrected as shown below:

COLUMN 1

Line 23, "prevaling" should read --prevailing--.
Line 38, "dries" should read --dry--.

COLUMN 3

Line 34, "invent ion." should read --invention.--.

COLUMN 5

Line 18, "OR" should read --0%--.
Line 29, "21, 31," should read --27, 37,--; "51, 16," should read --57, 76,-- and "81," (2nd occurrence) should read --87,--.
Line 43, "72" should read --72 and 77,--.

COLUMN 6

Line 66, "200 pl" should read --200 pl,--.

COLUMN 7

Line 36, "film" should read --film 16--.

COLUMN 8

Line 30, "a" should read --an--.

COLUMN 9

Ex. 2, "Tetraethlene" should read --Tetraethylene --.

--

UNITED STATES PATENT AND TRADEMARK OFFICE

CERTIFICATE OF CORRECTION

PATENT NO. : 5,358,558

DATED : October 25, 1994 Page 2 of 2

INVENTOR(S) : TOMOYA YAMAMOTO, ET AL.

It is certified that error appears in the above-indentified patent and that said Letters Patent is hereby corrected as shown below:

COLUMN 13

Line 38, Insert: --TABLE 3--.
Line 44, "156" should be deleted.

COLUMN 26

Line 63, "of" should read --of a--.
Line 67, "thiodiglyciol" should read --thiodiglycol--.

COLUMN 27

Line 3, "tetramers," should read --tetramers;--.
Line 6, "areas," should read --areas;--.

COLUMN 28

Line 27, "wight" should read --weight--.

Signed and Sealed this

Twelfth Day of September, 1995

Attest:

BRUCE LEHMAN

Attesting Officer

Commissioner of Patents and Trademarks